United States Patent
Hattab et al.

(10) Patent No.: US 12,207,123 B2
(45) Date of Patent: Jan. 21, 2025

(54) SUBBAND CHANNEL STATE INFORMATION REPORTING

(71) Applicant: Apple Inc., Cupertino, CA (US)

(72) Inventors: Ghaith N. Hattab, Santa Clara, CA (US); Louay Jalloul, San Jose, CA (US); Ismael Gutierrez Gonzalez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 17/868,611

(22) Filed: Jul. 19, 2022

(65) Prior Publication Data
US 2023/0067545 A1    Mar. 2, 2023

Related U.S. Application Data

(60) Provisional application No. 63/238,721, filed on Aug. 30, 2021.

(51) Int. Cl.
*H04W 24/10* (2009.01)
*H04L 5/00* (2006.01)
*H04W 24/08* (2009.01)

(52) U.S. Cl.
CPC .......... *H04W 24/10* (2013.01); *H04L 5/0048* (2013.01); *H04L 5/0055* (2013.01); *H04W 24/08* (2013.01)

(58) Field of Classification Search
CPC .............................. H04W 24/10; H04W 24/08
See application file for complete search history.

(56) References Cited

U.S. PATENT DOCUMENTS

| | | | |
|---|---|---|---|
| 2019/0199421 A1* | 6/2019 | Liu | H04B 7/0632 |
| 2019/0372704 A1* | 12/2019 | Wang | H04B 7/0632 |
| 2020/0099473 A1 | 3/2020 | Han et al. | |
| 2021/0175952 A1* | 6/2021 | Wu | H04B 7/0626 |
| 2022/0015100 A1* | 1/2022 | Yerramalli | H04L 5/0023 |
| 2022/0210674 A1* | 6/2022 | Hirzallah | H04L 5/005 |

OTHER PUBLICATIONS

Discussion on CSI-RS Design, Qualcomm Incorporated, 3GPP TSG RAN WG1 NR Ad-Hoc #3, R1-1716721, Sep. 18-21, 2017, 6 pages.
European Patent Application No. 22186320.2, Extended European Search Report, Dec. 19, 2022, 9 pages.
The European Application No. EP22186320.2, "Intention to Grant," mailed May 15, 2024, 9 pages.

\* cited by examiner

*Primary Examiner* — Zhiren Qin
(74) *Attorney, Agent, or Firm* — Kilpatrick Townsend & Stockton LLP

(57) ABSTRACT

The present application relates to devices and components including apparatus, systems, and methods to perform CSI-reporting. In an example, a BWP includes "M" subbands and is configured to the UE. The UE can process "Kc" CSI-RS samples to generate "M" subband CSI reports, where "Kc>M." The UE determines what number of CSI-RS samples to use per subband based on the channel information of the BWP, where this number can vary between the subbands.

20 Claims, 12 Drawing Sheets

900

Determining that Kc channel state information reference signal (CSI-RS) samples are to be used in channel state information (CSI) reporting for M subbands, wherein Kc and M are positive integers, M < Kc, and the M subbands belong to a bandwidth part (BWP) 902

Determining that a first number of CSI-RS samples of the Kc CSI-RS samples is to be used for a first subband of the M subbands, wherein the first number of CSI-RS samples is different from a second number of CSI-RS samples determined for a second subband of the M subbands, wherein the first number of CSI-RS samples is determined based on channel information associated with the BWP 904

Generating a CSI report for the first subband by at least using CSI-RS samples associated with the first subband, wherein a total number of the used CSI-RS samples for the CSI report is equal to the first number of CSI-RS samples 906

Sending the CSI report to a network 908

FIG. 9

SUBBAND CHANNEL STATE INFORMATION REPORTING

CROSS-REFERENCE TO RELATED APPLICATION

This application claims the benefit of U.S. Provisional Patent Application No. 63/238,721, filed Aug. 30, 2021. The disclosure of this application is incorporated by reference herein in its entirety.

BACKGROUND

Fifth generation mobile network (5G) is a wireless standard that aims to improve upon data transmission speed, reliability, availability, and more. This standard, while still developing, includes numerous details relating to estimating a quality of a channel used for communication between a user equipment (UE) and a network (e.g., a base station of the network) in order to improve the communication's quality of service.

BRIEF DESCRIPTION OF THE DRAWINGS

FIG. 9 illustrates an example of an operational flow/algorithmic structure for selecting CSI-RS sample in subbands based on channel information of a BWP that includes the subbands, in accordance with some embodiments.

DETAILED DESCRIPTION

Figure 1:
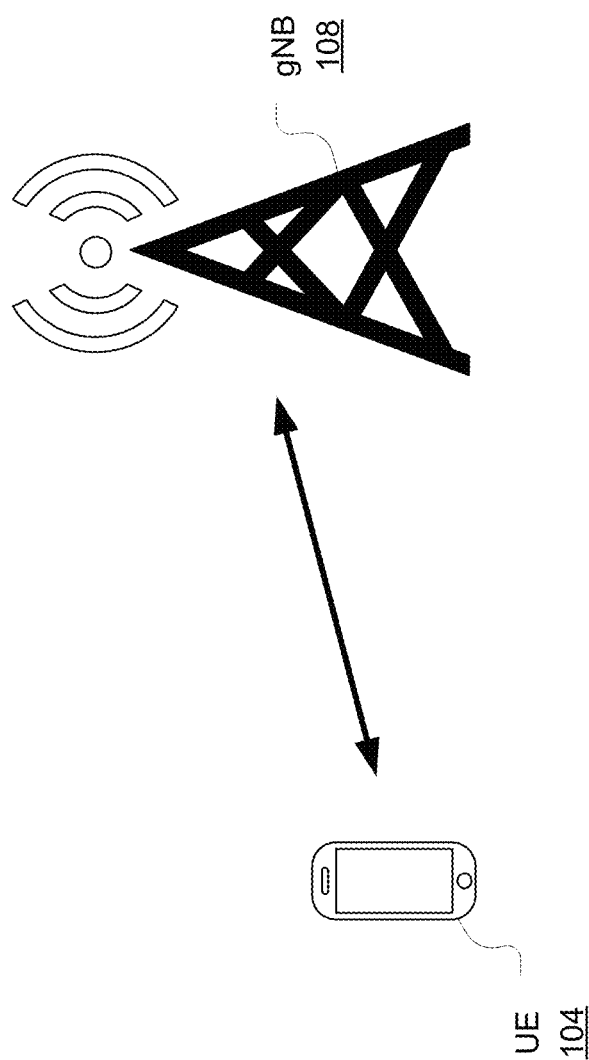
FIG. 1 illustrates an example of a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate with a network, such as with one or more base stations or other network nodes, using channels in different frequency ranges. The network can allocate a bandwidth part (BWP) for the communication, where the BWP can include multiple subbands. The UE may send subband channel state information (CSI) reports to the network to support the network's manage of the communication (e.g., link adaptation that may include UE subband allocation). To generate a CSI report for a subband, the UE may use CSI reference signal (CSI-RS) samples estimated from physical resource blocks (PRBs) of the subband.

In certain situations, the BWP includes "M" subbands, and "Kc" CSI-RS samples are estimated across the "M" subbands, where "Kc>M". When generating a CSI report for a subband, the UE may select and use only a subset of the CSI-RS samples estimated for the subband based on channel information of the entire BWP. Generally, because the network typically allocates some but not all the subbands to the UE, then by using the channel information, the UE can determine which subbands are most likely to be allocated and use more CSI-RS samples for these subbands. This approach to selecting and using a subset of CSI-RS samples can reduce the processing associated with CSI reporting and related memory area space with minimal performance impact, among other improvements.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit) ASIC(, a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network component of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100, in accordance with some embodiments. The network environment 100 may include a UE 104 and a gNB 108. The gNB 108 may be a base station that provides a wireless access cell, for example, a Third Generation Partnership Project (3GPP) New Radio (NR) cell, through which the UE 104 may communicate with the gNB 108. The UE 104 and the gNB 108 may communicate over an air interface compatible with 3GPP technical specifications such as those that define Fifth Generation (5G) NR system standards.

The gNB 108 may transmit information (for example, data and control signaling) in the downlink direction by mapping logical channels on the transport channels, and transport channels onto physical channels. The logical channels may transfer data between a radio link control (RLC) and MAC layers; the transport channels may transfer data between the MAC and PHY layers; and the physical channels may transfer information across the air interface. The physical channels may include a physical broadcast channel (PBCH), a physical downlink control channel (PDCCH), and a physical downlink shared channel (PDSCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure (including cell selection and reselection) and for beam selection.

The PDSCH may be used to transfer end-user application data, signaling radio bearer (SRB) messages, system information messages (other than, for example, MIB), and paging messages.

The PDCCH may transfer DCI that is used by a scheduler of the gNB 108 to allocate both uplink and downlink resources. The DCI may also be used to provide uplink power control commands, configure a slot format, or indicate that preemption has occurred.

The gNB 108 may also transmit various reference signals to the UE 104. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel status information reference signals (CSI-RS). The CSI-RS may be a multi-purpose downlink transmission that may be used for CSI reporting, beam management, connected mode mobility, radio link failure detection, beam failure detection and recovery, link adaptation, and fine-tuning of time and frequency synchronization.

The reference signals and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing (OFDM) symbol in the time domain. Twelve consecutive subcarriers in the frequency domain may compose a physical resource block (PRB). A resource element group (REG) may include one PRB in the frequency domain and one OFDM symbol in the time domain, for example, twelve resource elements. A control channel element (CCE) may represent a group of resources used to transmit PDCCH. One CCE may be mapped to a number of REGs, for example, six REGs.

The UE 104 may transmit data and control information to the gNB 108 using physical uplink channels. Different types of physical uplink channels are possible including, for instance, a physical uplink control channel (PUCCH) and a physical uplink shared channel (PUSCH). Whereas the PUCCH carries control information from the UE 104 to the gNB 108, such as uplink control information (UCI), the PUSCH carries data traffic (e.g., end-user application data) and can carry UCI.

In an example, communications with the gNB 108 and/or the base station can use channels in the frequency range 1 (FR1) band, frequency range 2 (FR2) band, and/or high frequency range (FRH) band. The FR1 band includes a licensed band and an unlicensed band. The NR unlicensed band (NR-U) includes a frequency spectrum that is shared with other types of radio access technologies (RATs) (e.g., LTE-LAA, WiFi, etc.). A listen-before-talk (LBT) procedure can be used to avoid or minimize collision between the different RATs in the NR-U, whereby a device should apply a clear channel assessment (CCA) check before using the channel.

Figure 2:
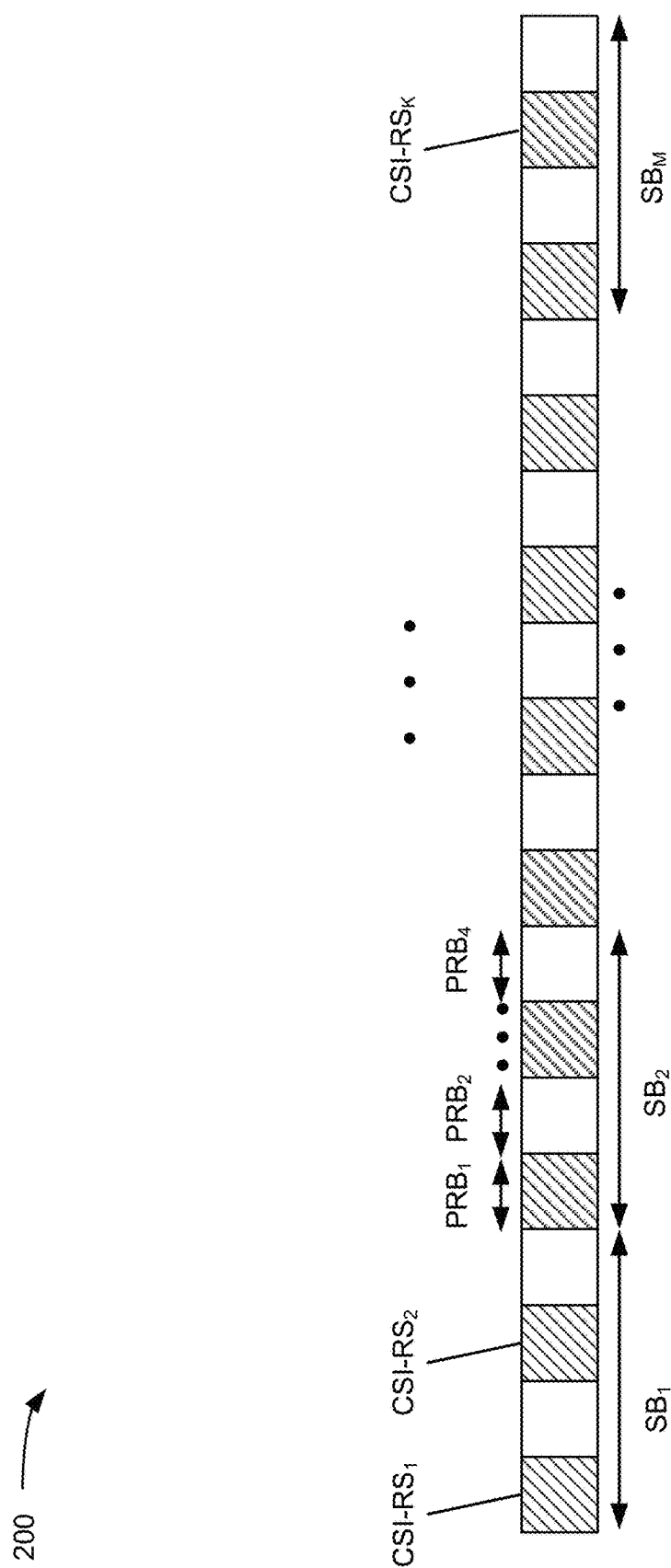
FIG. 2 illustrates an example of a bandwidth part that includes multiple subbands and channel state information reference signal (CSI-RS) resources allocated in the subbands, in accordance with some embodiments.

FIG. 2 illustrates an example of a BWP 200 that includes multiple subbands and CSI-RS resources allocated in the subbands, in accordance with some embodiments. Generally, the CSI-RS resources are physical resource blocks (PRBs) that carry the CSI-RS's. These PRBs are processed measured by a UE to estimate and store CSI-RS samples in a memory of the UE. The CSI-RS samples can be used for different purposes, including for CSI reporting. A CSI report can indicate quantities, such as channel-quality indicator (CQI) and precoding matrix indicator (PMI), where these quantities are relevant for CSI in LTE and 5G NR. For instance, the reported quantities can assist a network with link adaptation.

In LTE, carriers have a bandwidth up to 20 MHz maximum and can be aggregated together to create a channel bandwidth up to 100 MHz in LTE-Advance, or up to 640 MHz in LTE-Advanced Pro. In comparison, in 5G NR, the carrier bandwidth is up to 100 MHz in frequency range 1 (FR1: 450 MHz to 6 GHz) and up to 400 MHz in frequency range 2 (FR2: 24.25 GHz to 52.6 GHz), and carriers can be aggregated with a maximum bandwidth of 800 MHz.

In 5G NR, the BWP 200 allows the division of a carrier and can be configured differently with its own signal characteristic. The BWP 200 includes a subset of contiguous PRBs (their number is referred to herein as "$K_{tot}$"). "Ktot" up to two-hundred seventy-five PRBs. The network can configure the UE with up to four BWPs in the uplink or four BWPs in the downlink. An additional four BWPs can be configured in a supplementary uplink. Typically, one BWP in the UL and one in the DL are active at a given time.

As illustrated in FIG. 2, the PRBs (shown as squares) can form "M" subbands of the BWP 200. In the particular illustration of FIG. 2, the first four PRBs of the BWP 200 form the first subband (shown as "$SB_1$"), the next four PRBs of the BWP 200 form the next subband (shown as "$SB_2$") and so on, until the last set of PRBs forming the last M-th subband (shown as "$SB_M$"). Of course, the size of a subband (e.g., the number of PRBs) can vary and need not be four PRBs. Generally, this size can be four, eight, sixteen, or thirty-two PRBs and can depend on the size (or size range) of the BWP 200 (e.g. "$K_{tot}$").

Depending on network-configured CSI-RS density, the CSI-RSs can be distributed across the PRBs of the BWP 200. In the particular illustration of FIG. 2, every other PRB carries a CSI-RS (shown as "$CSI-RS_1$," "$CSI-RS_2$," . . . , "$CSI-RS_K$" for a total of "K" CSI-RSs). In this illustration, "K" is equal half of "$K_{tot}$," although, more generally, "K" is smaller than or equal to "$K_{tot}$."

The UE may measure, estimate, and store in a memory buffer "K" CSI-RS samples for the subbands (e.g., the samples of "$CSI-RS_1$" and "$CSI-RS_2$" in "$SB_1$" and so on up to the sample of "$CSI-RS_K$" in "$SB_M$"). These samples can be used for different purposes, including to generate CSI reports.

In an example, the network may configure the UE to report CQI and PMI (and other CSI-related quantities) at a subband level. As such, the UE is configured to report at least "M" CQIs and "M" PMIs, referred to as subband reporting quantities. For each subband, the corresponding quantities can be included in a subband CSI report.

To generate the subband CSI report for the first subband (e.g., "$SB_1$"), the UE may use the samples of the measured and estimated CSI-RSs measured in this subband (e.g., the two samples of "$CSI-RS_1$" and "$CSI-RS_2$" in FIG. 2). This approach may also apply to each subband. Hence, the UE may use "K" CSI-RS samples to generate "M" subband CSI reports. However, due to resource or hardware constraints, the UE may not be able to use or store all "K" CSI-RS samples to generate "M" subband CSI reports. The constraints can include memory layout, vector processor architecture, timing requirements, etc. Further, "K" can considerably vary depending on the BWP 200 (e.g., its size) and the higher-layer configurations (e.g., the RRC configuration sent by the network).

Thus, to reduce the UE complexity (e.g., reduce the memory area needed to buffer CSI-RS samples and reduce processing related to CSI reporting (which translates to reducing the UE's power consumption), a number "Kc" of CSI-RS samples can be used instead of "K" even if "K" changes from one reporting instance to another, where "Kc" is typically smaller than "K" and larger than "M." In an example, "Kc" can be a fixed number per design of the UE.

Hence, rather than buffering and/or processing "K" CSI-RS samples, "Kc" CSI-RS samples are used instead and this number of used CSI-RS samples is larger than the number "M" of subbands. As such, the UE needs to select "Kc" PRBs out of "K" PRBs (or "Kc" CSI-RSs out of "K" CSI-RSs) for its subband CQI reporting. Because "Kc" is larger than "M," the UE needs to determine how to perform this selection across the different subbands by determining the individual number of CSI-RS samples to use per subband such that the total (e.g., sum) of the individual numbers is equal to "Kc." This per subband and across subband selection can be referred to herein as a "CSI-RS to subband assignment" and is further illustrated in the next figures. In various embodiments, the selection process relies on channel information of the BWP 200 such that the UE can generate "M" subband CSI-reports with minimal degradation to the UE key performance indicators (KPIs), such as rate or throughput. In other words, the embodiments allow for the reduction of the UE complexity (e.g., smaller memory area, smaller power consumption), with minimal performance degradation with respect to subband CSI reporting.

To illustrate, consider the following numerical example. "$K_{tot}$" of the BWP 200 is two-hundred and seventy-two PRBs. The UE down-samples the BWP 200 by a factor of eight and thus stores "K=34" CSI-RS samples. Each subband has a size of sixteen PRBs. Thus, the total number "M" of subbands is seventeen (e.g., two-hundred and seventy-two divided by sixteen). Because "K=34" and "M=17," the UE has basically stored two CSI-RS samples per subband. However, due to constraints, the UE can only process "Kc=24" CSI-RS samples for CSI reporting. Hence, the UE can use, for each subband, its corresponding two CSI-RS samples to generate the subband's CSI report. The selection process of the embodiments of the present disclosure allow the UE to select the "Kc" (e.g., twenty-four) CSI-RS samples out of the "K" (e.g., thirty-four) CSI-RS samples to generate "M" (e.g., seventeen) subband CSI reports. Per this process, for a set of the subbands, one CSI-RS sample is selected per subband, while for a remaining set of the "M" subbands, more than one CSI-RS samples are selected per subband. As such, the number of CSI-RS samples used per subband can vary across the subbands.

Figure 3:
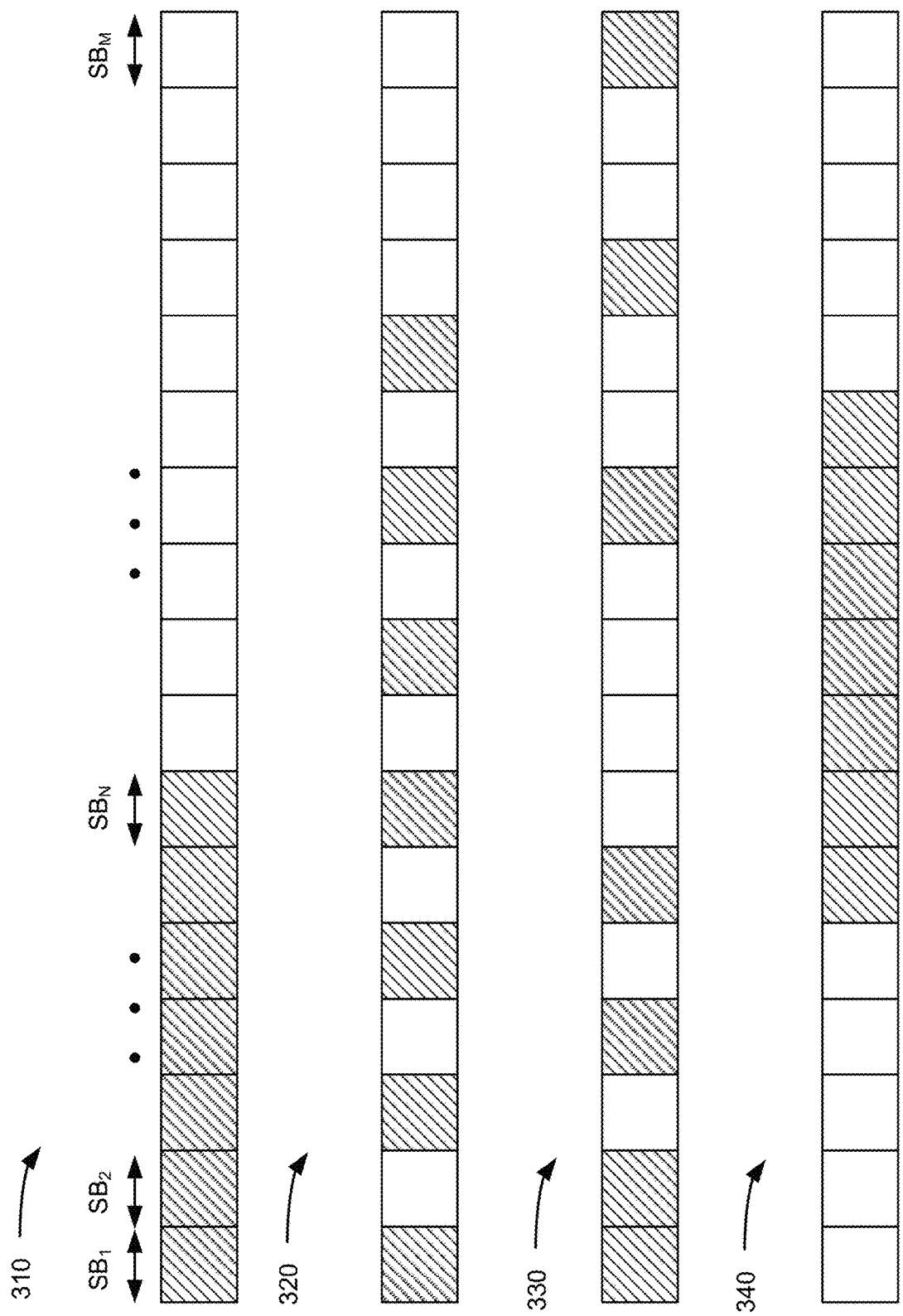
FIG. 3 illustrates examples of CSI-RS sample selections in subbands, in accordance with some embodiments.

FIG. 3 illustrates examples of CSI-RS sample selections in subbands, in accordance with some embodiments. Each subband is shown with a square. In the interest of clarity of explanation, seventeen subbands are shown (e.g., "M=17") and the above numerical example is re-used. Four example selections are shown: a first baseline selection 310, a second baseline selection 320, a third baseline selection 330, and a fourth baseline selection 340. These baseline selections may not rely on channel information for the CSI-RS to subband assignment.

Since "M<Kc<K," we have "Kc=l. M+N," where "l" is a positive integer, "l" is the integer quotient of a division of "Kc" by "M," "N" is the integer remainder of the division, and "N<M." Using this nomenclature and referring back to the above numerical example, "Kc=24," "M=17," "l=1," and "N=7."

To generate "M" subbands CSI-RS reports, at least one CSI-RS sample is needed per subband. "l" can be set to be this minimum number. As such, "N" (e.g., seven) extra CSI-RS samples can be assigned to some but not all "M" subbands.

The first baseline selection 310 uses an ascending order of subband index. In other words, subbands "1" to "N" have "l+1=2" CSI-RS samples. This type of CSI-RS to subband assignment is shown with the diagonally shaded squares. In comparison, subbands "N+1" to "M" have "l=1" CSI-RSs. This type of CSI-RS to subband assignment is shown with the blank squares. Alternatively, a descending order can be used.

The second baseline selection 320 uses a uniform distribution over the "M" subbands. Every two subbands (or, more generally, every "X" subbands) are assigned an extra CSI-RS sample (e.g., for a total of "l+1=2" per each of these subbands), whereas each of the remaining subbands is only assigned the "l=1" CSI-RS sample. These two types of CSI-RS to subband assignment are shown with the diagonally shaded squares and blank square, similarly to the above illustration.

The third baseline selection 330 uses a random assignment over the "M" subbands. In particular, the "N" extra CSI-RS samples are arbitrarily assigned. Similarly to the above, the diagonally shaded squares indicate an assignment of "l+1=2" CSI-RS samples, whereas blank squares an assignment of "l=1" CSI-RS sample.

The fourth baseline selection 340 uses a centered assignment. The middle of the BWP is assigned the "l+1" CSI-RS samples and this assignment is spread outwardly in the direction of the edges of the BWP until all of the "N" extra CSI-RS samples are assigned. Similarly to the above, the diagonally shaded squares indicate an assignment of "l+1=2" CSI-RS samples, whereas blank squares an assignment of "l=1" CSI-RS sample.

Generally, the four above baseline selections can reduce the UE complexity related to CSI-reporting. However, and as further illustrated in the next figures, a performance gain can be made relative to these baseline approaches by using channel information in the CSI-RS to subband assignment with minimal or no impact to the reduced UE complexity.

Figure 4:
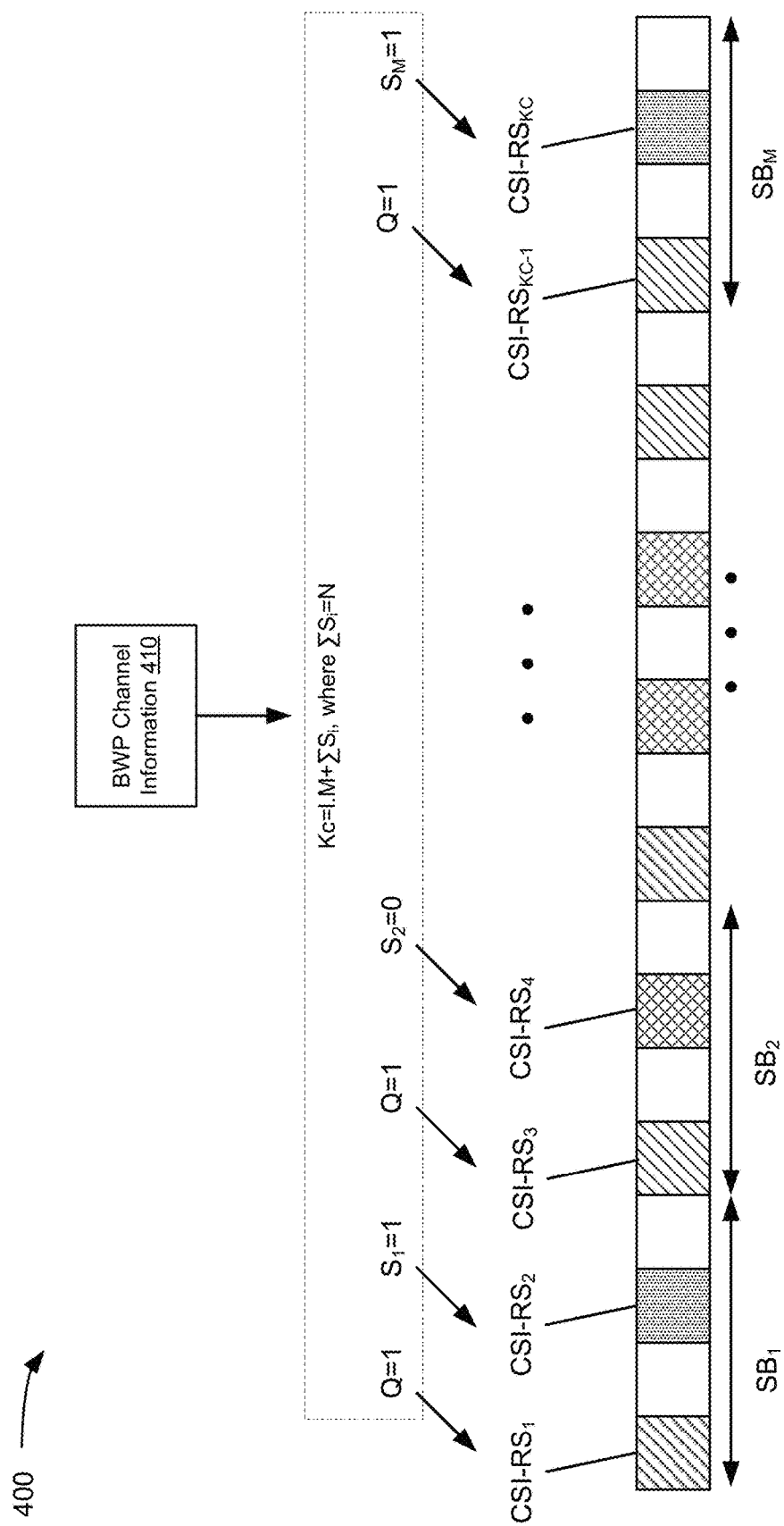
FIG. 4 illustrates an example of CSI-RS samples selection in subbands based on channel information of a BWP that includes the subbands, in accordance with some embodiments.

FIG. 4 illustrates an example of CSI-RS samples selection 400 in subbands based on channel information 410 of a BWP that includes the subbands, in accordance with some embodiments. The BWP includes "M" subbands. "Kc" samples of CSI-RS resources are available to generate "M" subband CSI reports, where "M<Kc." The UE determines, for each subband "i" (where "i" is the subband index), that at least "l. M" samples of estimated CSI-RS resources in the subband "i" are to be used to generate the subband CSI report of this subband "i." Based on the channel information 410, the UE also determines how to allocate the "N" extra CSI-RS samples, such that each subband "i" may use "$S_i$" extra samples (if any) of the CSI-RS resources in the subband "i" to generate the subband CSI report of this subband "i." For example, "$S_i$" can be equal to one, two, or any other value (referred to herein below as "$l_2$"), and where this value may, but need not, vary between the subbands (e.g., "$S_i \in \{0, 1, 2, \ldots, \text{Max}\}$"). This CSI-RS to subband assignment can be expressed "Kc=l. M+$\Sigma_{i=1}^{M} S_i$," where "$\Sigma_{i=1}^{M} S_i = N$."

In the illustration of FIG. 4, a diagonally shaded square corresponds to one of the "l.M=$Q_i$" CSI-RS samples selected for use in generating a subband CSI report of a subband "i" ("l" being the integer quotient of a division of "Kc" by "M"). A dotted-shaded square corresponds to one of the "$S_i$" CSI-RS samples selected for use in generating the subband CSI report of a subband "i." A cross-shaded square corresponds to one of the CSI-RS samples estimated for a subband "i" but not selected for use in generating the subband CSI report of a subband "i." As shown in the figure, "$SB_1$" is assigned "Q=1" and "$S_1$=1" for a total of two CSI-RS samples. In comparison, "$SB_2$" is assigned "Q=1" and "$S_1$=0" for a total of one CSI-RS sample, and so on until the M-th subband, where "$SB_M$" is assigned "Q=1" and "$S_M$=1" for a total of two CSI-RS samples. "$S_i$" can vary between the subbands based on the channel information 410, such that at least one of the subbands may be assigned a total number of CSI-RS samples that is different from a total number assigned to at least another one of the subbands.

Generally, the channel information 410 of the BWP includes channel quality and/or channel characteristics of the "M" subbands over time and/or frequency. For example, the channel information 410 can include any or a combination of a noise power per subband, a signal power per subband, a coherence bandwidth of a subband group, a throughput per subband, block error rate (BLER) per subband, a number of acknowledgments (ACKs) or negative-acknowledgments (NACKs) per subband, a magnitude of a log-likelihood ratio per subband, or a rate per subband of subband allocation to the UE by the network.

In an example, the network relies on frequency-selective scheduling, where the UE is typically scheduled over portions of the BWP with good channel conditions. Thus, PRBs that are likely to be allocated to the UE should have more accurate CSI (or reporting quantities). To this end, a higher number of CSI-RS samples of the subbands should be selected when such subbands are more likely to be provisioned for allocation to the UE. The channel information 410 can be used as a way to anticipate the subband allocation. In other words, when the channel information 410 indicates a higher likelihood of a first subband channel to be allocated to the UE relative to the likelihood of a second subband, the UE can select a relatively higher number of samples of the CSI-RS resources in the first subband relative to the number of CSI-RS samples selected for the second subband.

In an example, the CSI-RS to subband assignment can be formulated using a general optimization problem. For example, a function can be defined based on the channel information. An optimization of this function can indicate whether a CSI-RS sample of a subband is to be assigned to the subband for the use in generating this subband's CSI report. The optimization depends on the channel information. The function can include a cost function, where the optimization includes a minimization of a cost of the CSI-RS to subband assignment. Additionally or alternatively, the function can include a reward function, where the optimization includes a maximization of a reward of the CSI-RS to subband assignment.

As far as a cost function, it can be defined as the following. Let $x_i \in \{0,1\}$ be a subband indicator, where "$x_i$=1" indicates that one out of "N" extra CSI-RS samples is assigned to the i-th subband. Let $c_i$ be the cost of assigning the extra CSI-RS sample to the i-th subband. The optimization problem can be defined as "min $\Sigma_{i=1}^{M} c_i x_i$" subject to "$\Sigma_{i=1}^{M} x_i = N$" and "$x_i \in \{0,1\}$." This problem can be solved using a linear program, including in a closed form. An example solution is to sort $c_i$ in ascending order, selecting eventually the "N" smallest values. For these values, $x_i$ is set to one (e.g., "$x_i$=1"). For rest of the values, $x_i$ is set to zero (e.g., "$x_i$=0"). The cost function $c_i$ can be defined as a function of a noise power per subband "i," a signal power per subband "i," a measure of coherence bandwidth of a subband group, a throughput per subband "i," a BLER per subband "i," a number of ACKs or NACKs per subband "i," a magnitude of a log-likelihood ratio per subband "i," or a rate per subband "i" of subband allocation to the UE by the network.

As far as a cost function, it can be defined in a similar manner, whereby a reward $r_i$ replaces the cost $c_i$. The optimization problem can then be defined as "max $\Sigma_{i=1}^{M} r_i x_i$," subject to "$\Sigma_{i=1}^{M} x_i = N$" and "$x_i \in \{0,1\}$." An example solution is to sort $r_i$ in descending order, selecting eventually the "N" largest values. For these values, $x_i$ is set to one (e.g., "$x_i$=1"). For rest of the values, $x_i$ is set to zero (e.g., "$x_i$=0"). The reward function $r_i$ can be defined as a function of a noise power per subband "i," a signal power per subband "i," a coherence bandwidth of a subband group, a throughput per subband "i," a BLER per subband "i," a number of ACKs or NACKs per subband "i," a magnitude of a log-likelihood ratio per subband "i," or a rate per subband "i" of subband allocation to the UE by the network. In an example, the reward function $r_i$ can be defined as the opposite of the cost function $c_i$ (e.g., "$r_i = -c_i$") or the inverse of the cost function $c_i$ (e.g., "$r_i = c_i^{-1}$").

Furthermore, the above optimization problem is defined based on the expression "Kc=(l.M+N) by using the term $x_i \in \{0,1\}$ for the assignment from the "N" CSI-RS samples. The expression can be generalized and, depending on the generalization, the term $x_i$ is defined and used in the function (e.g., cost function(s) and/or reward function(s)). For example, the following expression is used "Kc=$l_1$.M+$l_2$.N." "$l_1$" is the integer quotient of a division of "Kc" by "M," and "Q=$l_1$.M." In this example, "$l_1$" CSI-RS samples are assigned to each subband "i," "Q" CSI-RS samples are assigned to the "M" subbands, and "$l_2$" samples are assigned to "N" subbands. As such, an additional number "$S_i$=$l_2$" of CSI-RS samples is assignable to the subbands, wherein only a total "N" subbands is assigned this number "$S_i$" of CSI-RS extra samples. In this case, the above optimization problem can be solved, where $x_i \in \{0,l_2\}$.

Referring back to FIG. 3, the baseline selections can be viewed as special cases of the optimization problem that uses a cost function (e.g., "min $\Sigma_{i=1}^{M} c_i x_i$"). For instance, the first baseline selection 310 is achieved by assigning "$c_i$=1" for "i=1, N," and "$c_i$=2" for "i=N+1, . . . , M (or any higher value)." The second baseline selection 320 is achieved by assigning "$c_{i+kX}$=1" for "i=1, . . . , N," and "$c_i$=2" for the rest. The third baseline selection 330 is achieved by randomizing the values of $c_i$. The fourth baseline selection 340 is achieved by assigning "$c_i$=1" for the middle subbands and "$c_i$=2" otherwise.

Figure 5:
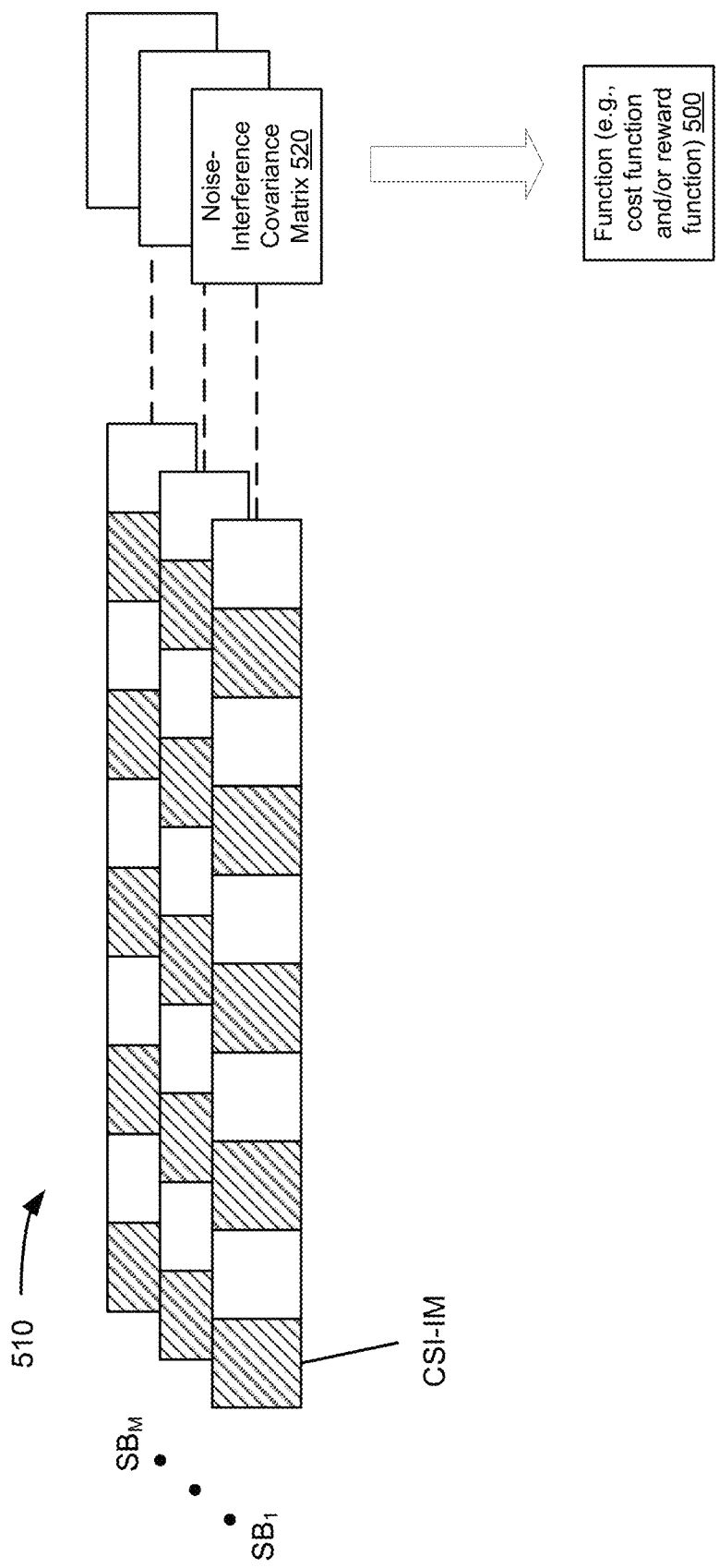
FIG. 5 illustrates an example of a noise power-based function usable for the CSI-RS sample selections in subbands, in accordance with some embodiments.

FIG. 5 illustrates an example of a noise power-based function 500 usable for the CSI-RS sample selections in subbands 510, in accordance with some embodiments. A BWP includes "M" subbands 510 (shown as "$SB_1$," "$SB_2$," . . . , "$SB_M$"). Various signals can be carried in the PRBs of each subband "i." Some of these signals can be used to estimate a noise power for the subband "i." The noise power across the "M" subbands 510 can be included in the channel information used in the optimization of the noise power-based function 500.

In an example, CSI interference measurement (CSI-IM) signals can be carried by the PRBs and are shown in the figure with the diagonally shaded squares. Although a particular CSI-IM pattern is shown per subband, another pattern is possible. Further, different patterns can be used across the "M" subbands. The UE estimates the noise and interference in each subband "i" by, for instance, measuring the CSI-IM resources in that subband "i." The UE also stores $R_{nn,i}$ which is the estimated noise and interference covariance matrix 520 of the subband "i."

The noise power-based function 500 can be defined based on the noise and interference covariance matrix 520. Generally, the larger the noise and interference estimate of a subband "i" is, the smaller the number "Si" of additional CSI-RS samples to be assigned to the subband "i" becomes because the higher the likelihood is that the network may not allocate this subband "i" to the UE. For instance, the noise power-based function 500 includes a cost function defined as "$c_i = f(R_{nn,i})$," Where "$f(\ )$" is a mapping function that converts the noise and interference covariance matrix 520 into a scalar. This mapping function can be a representation of how noisy a subband is. An example of the mapping function is a spectral norm that quantifies the noise, where "$c_i = \|R_{nn,i}\|_2^2$." Another example of the mapping function is a total power in the noise and interference covariance matrix 520, where "$c_i = tr(R_{nn,i})$." As explained here above, the noise power-based function 500 can include a reward function. A similar mapping can be used, where for instance, "$r_i = -c_i$."

Figure 6:
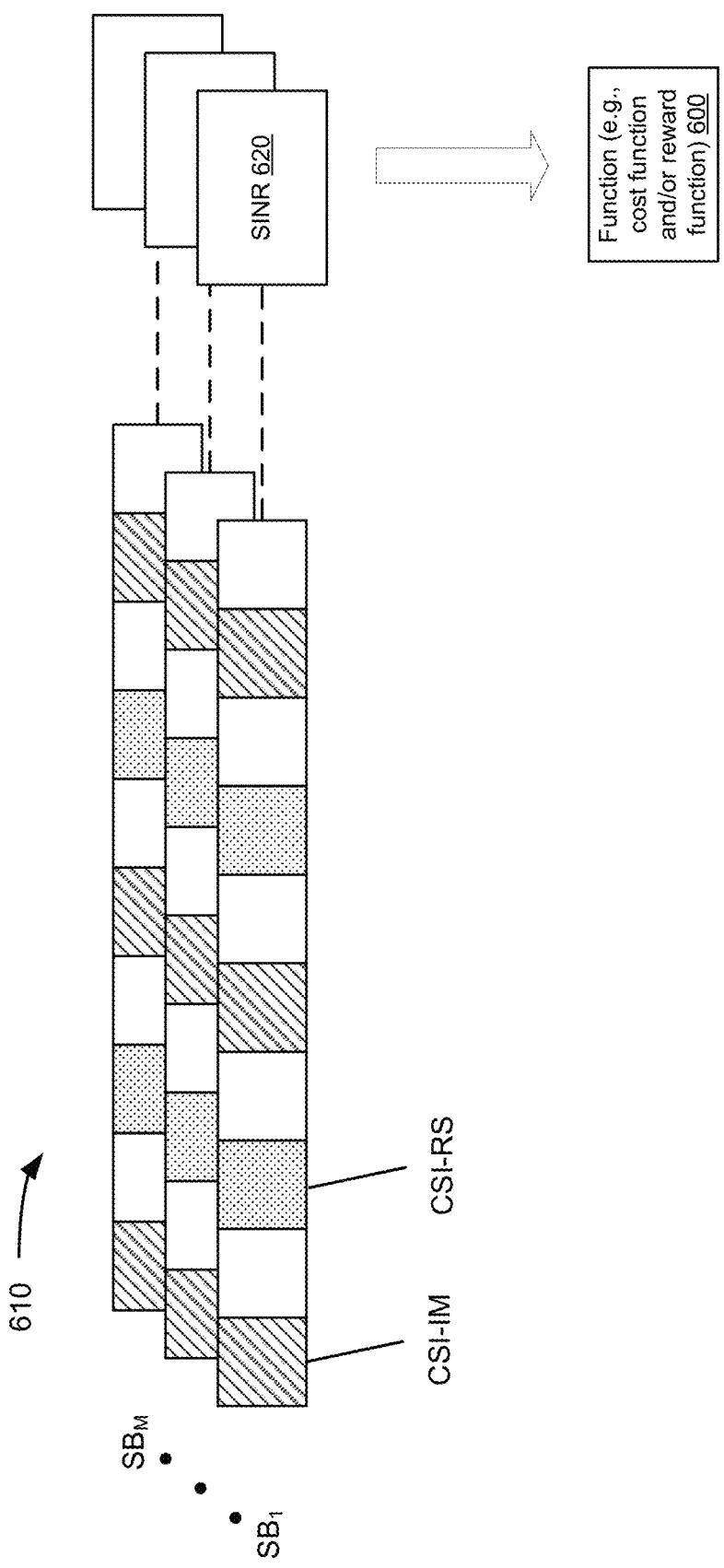
FIG. 6 illustrates an example of a signal power-based function usable for the CSI-RS sample selections in subbands, in accordance with some embodiments.

FIG. 6 illustrates an example of a signal power-based function 600 usable for the CSI-RS sample selections in subbands 610, in accordance with some embodiments. A BWP includes "M" subbands 610 (shown as "$SB_1$," "$SB_2$," ..., "$SB_M$"). Various signals can be carried in the PRBs of each subband "i." Some of these signals can be used to estimate an average power for the subband "i." The average power across the "M" subbands 610 can be included in the channel information used in the optimization of the signal power-based function 600.

In an example, CSI-IM signals can be carried by the PRBs and are shown in the figure with the diagonally-shaded squares. In addition, CSI-RS can be carried by the PRBs and are shown in the figure with the dotted-shaded squares. Although a particular CSI-IM pattern and a particular CSI-RS are shown per subband, other patterns are possible and the CSI-IM pattern can be different than the CSI-RS pattern. Further, different patterns can be used across the "M" subbands. The UE estimates the noise and interference in each subband "1" (e.g., $R_{nn,i}$) by, for instance, measuring the CSI-IM resources. Further, "K" CSI-RS samples are estimated across the BWP (not just "Kc") and usable for purposes other than subband CSI reporting (e.g., one purpose includes the average power estimation across the BWP). An average power per subband "i" can be derived based on these estimates and expressed as a SINR estimate given the noise and interference estimate in the subband "i."

The signal power-based function 600 can be defined based on the average power per subband "i." Generally, the larger the average power of a subband "i" is, the larger the number "Si" of additional CSI-RS samples to be assigned to the subband "i" becomes because the higher the likelihood is that the network may allocate this subband "i" to the UE. For instance, SINR estimates of the M subbands 610 are used. In particular, the UE can estimate the SINR for a subband "i" (denoted as "$\gamma_i$") based on the noise and inteference estimate in the subband "i" and the measurements already performed on CSI-RS resources of the subband "i." The SINR estimate "$\gamma_i$" can be the average of the SINRs of the PRBs in the subband "i."

In an example, the signal power-based function 600 includes a cost function defined using the SINR estimate "$\gamma_i$" as a variable. For instance, the cost function is the opposite of the SINR estimate (e.g., "$c_i = -\gamma_i$"). In another illustration, the cost function is the inverse of the SINR estimate ("$c_i = \gamma_i^{-1}$").

Further, the UE can compute the SINR mean (denoted as "$\mu_i$") and the SINR variance (denoted as "$\sigma_i^2$") in each subband "i." The cost function can be based on the SINR mean and SINR variance, where "$c_i = f(\mu_i, \sigma_i^2)$," and where "$f(\ )$" is a mapping function. In one example, "$c_i = \sigma_i^2/\mu_i$," which is the coefficient of variation. This coefficient is a good representation of the reliability of the SINR estimates in the subband. In particular, if the SINR across PRBs in the subband vary widely, then this cost can be high as it indicates the SINR estimate may not be very reliable; similarly, if the mean is low (e.g., average SINR is low), then the cost is increased. In another example, "$c_i = 1/\sigma_i^2$." This cost reflects the amount of frequency diversity in the subband. In particular, when the variance is low, the diversity is low, and so more PRBs may not be needed in this subband (and, thus, the cost value is high).

As explained here above, the signal power-based function 600 can include a reward function. A similar mapping can be used, where for instance, "$r_i = \gamma_i$" or "$r_i = \log_1(1+\gamma_i)$."

Figure 7:
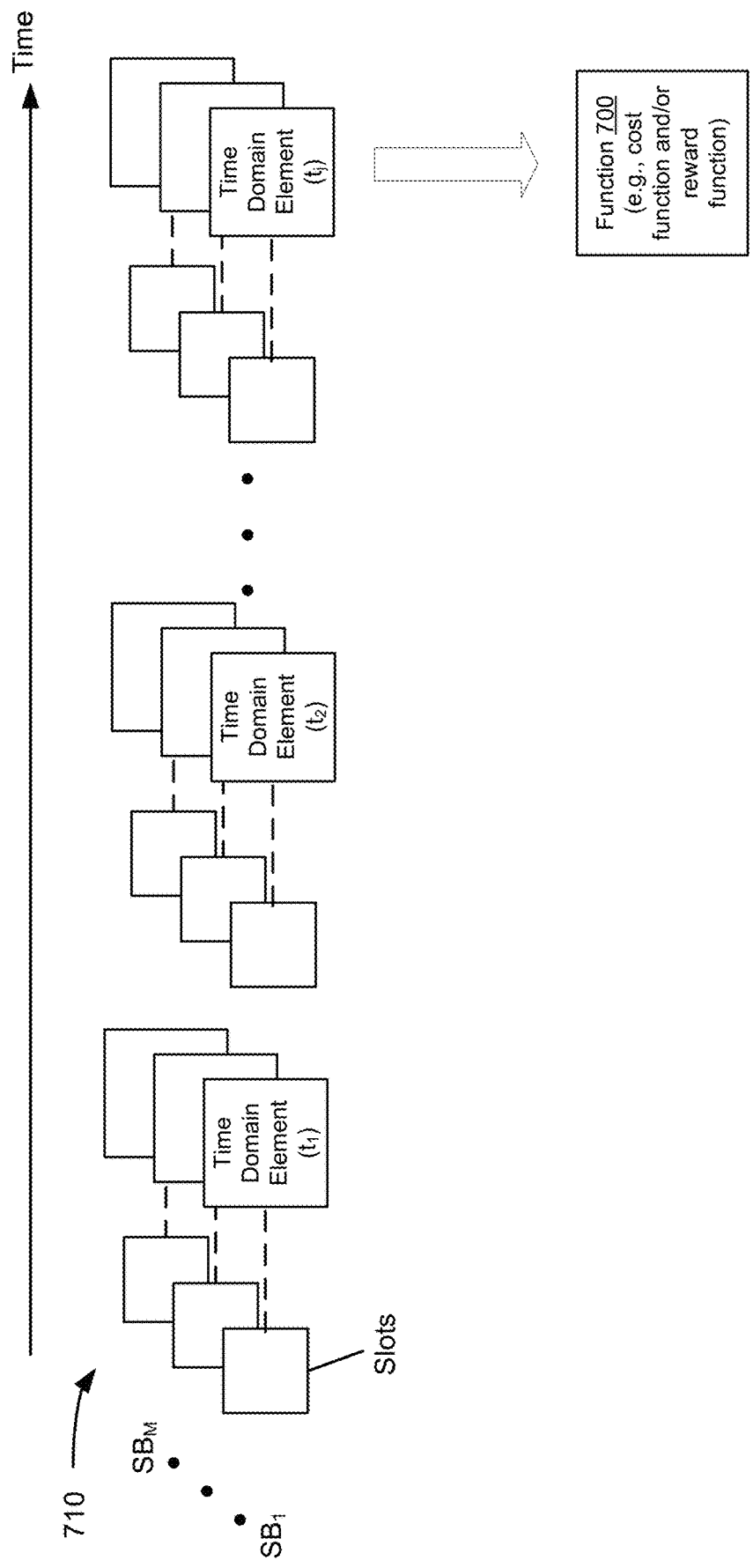
FIG. 7 illustrates an example of a time domain element-based function usable for the CSI-RS sample selections in subbands, in accordance with some embodiments.

FIG. 7 illustrates an example of a time domain element-based function 700 usable for the CSI-RS sample selections in subbands 710, in accordance with some embodiments. A BWP includes "M" subbands 710 (shown as "$SB_1$," "$SB_2$," ..., "$SB_M$"). Various signals can be carried in the PRBs of each subband "1" and different signal processing can be performed for each subband. This processing can result in measurements that can be monitored over time. A measurement, as monitored over time, can be referred to herein as a time-domain element. One or more time-domain elements can be included in the channel information used in the optimization of the time domain element-based function 700. The time-domain elements can include, per subband "i," a throughout a BLER, a number of ACKs or NACKs, a magnitude of a log-likelihood ratio (LLR), or a rate of the subband "i" being allocated to the UE by the network.

Consider the example of throughput as a time-domain element. A first throughput at time "$t_1$" can be measured for a subband "i" based on the decoding performed on symbols carried by PRBs of the subband "i" in previous slots up to time "$t_1$." Similarly, a second throughput at time "$t_2$" can be measured for the subband "1" based on the decoding performed on symbols carried by PRBs of the subband "i" in previous slots up to time "$t_2$," and so on up to a current time "$t_j$." Each throughput can be multiplied by a weighing coefficient "$\alpha$," the value of which can vary depending on the throughput's timing. The weighted throughputs can be summed to generate a weighted average throughput. The weighted average throughput per subband "i" can be used in the time domain element-based function 700. A similar approach can be used for any or a combination of the other types of time-domain elements.

In an example, the time domain element-based function 700 includes a cost function defined using a time-domain element (or a combination of time-domain elements). This cost function is expressed as "$c_{i,t}$," where "i" is the subband index and "t" is the current point in time. The cost function can be filtered over time by expressing it as "$c_{i,t} = \Sigma_{n=0} \alpha_n \cdot c_{i,t-n}$," where "$\alpha_n$" is a weighting coefficient. The use of time-domain filtering can be useful when the UE is configured with the same BWP over time.

In an example of throughput as a time-domain element, $c_{i,t}$ is a mapping function of a throughput per subband "i" over time. The throughput of a subband "i" can be the throughput achieved in previous time instances over the i-th subband. The mapping function generally lowers the cost if the throughput was high, and vice versa. As explained herein above, the time domain element-based function 700 can include a reward function. For throughput, the reward is made larger if the throughput was high.

In an example of BLER as a time-domain element, $c_{i,t}$ is a mapping function of a BLER per subband "i" over time. The BLER of a subband "i" can be the BLER achieved in previous slots over the i-th subband. The mapping function generally increases the cost if the BLER was high, and vice versa. As explained herein above, the time domain element-based function 700 can include a reward function. For BLER, the reward is made smaller if the BLER was high.

In an example of ACK/NACK as a time-domain element, $c_{i,t}$ is a mapping function of a number of ACKs and/or a number of NACKs (e.g., one of these two number or a ratio thereof) per subband "i" over time. The ACKs/NACKs of a subband "i" can be sent in response to data reception in previous slots over the i-th subband. The mapping function generally increases the cost if the number of NACKs was relatively higher, and decreases the cost if the number of ACKs was relatively higher. As explained herein above, the time domain element-based function 700 can include a reward function. For ACK/NACK, the reward is made smaller if the number NACKs was relatively higher, and is increased if the number of ACKs was relatively higher.

In an example of LLRs as a time-domain element, $c_{i,t}$ is a mapping function of a LLRs per subband "i" over time. The LLRs of a subband "i" can be obtained from the demodulator processing signals carried by the PRBs of the subband "i." These LLRs basically represent soft decisions, whereas ACKs/NACKs represent implicit hard decisions. In other words, LLRs convey more information about the link quality in the BWP than ACKs/NACKs. The mapping function generally increases the cost if the LLRs were low, and vice versa. As explained herein above, the time domain element-based function 700 can include a reward function. For LLRs, the reward is made larger if the LLRs were high.

In an example of subband allocation as a time-domain element, $c_{i,t}$ is a mapping function of a rate of a subband "i" of the BWP being allocated to the UE by the network over time. The UE can monitor over time, how often the subband "i" is allocated and this allocation frequency can be translated into a rate when compared to (e.g., normalized against) the allocation frequencies of the other subbands of the BWP. In certain situations, the network may allocate subbands of a BWP, where these subbands are part of PDSCH and can be differ over time from the subbands used for CSI reporting. In these situations, the UE may track the allocation of "PDSCH subbands." When a PDSCH subband overlaps with a "CSI-RS subband" (e.g., more than fifty percent or some other threshold number of the PRBs overlap), the UE considers the allocation to be that of the "CSI-RS subband" and uses this allocation in the computation of the allocation rate. The mapping function generally increases the cost for subband "i" if its allocation rate was relatively lower than that of other subbands of the BWP, and vice versa. As explained herein above, the time domain element-based function 700 can include a reward function. For the allocation rate, the reward is made larger if the allocation rate was relatively larger.

The above examples are provided for illustrative purposes. Other time-domain elements can be used. For instance, frequency-domain elements (such as noise power and/or signal power as described in FIGS. 5 and 6) can be monitored over time. This monitoring can result in a time domain element (e.g., noise power per subband as a function of time, signal power per subband as a function of time) that is then used in the time domain element-based function 700.

In another example, the UE can have an estimate on the delay spread or the coherence bandwidth of a subband group. For every group of consecutive subbands within the same coherence bandwidth, one subband (or a subset of the subbands) is selected and assigned a lower cost value (or a higher reward value), whereas remaining subbands of the group are assigned a higher cost value (or a lower reward value). This type of cost/reward assignment can be performed because these remaining, adjacent subbands are likely experiencing the same channel condition and no real performance gain can be achieved by assigning additional CSI-RS samples to them. In other words, it may be sufficient to select one of the subbands and assign to it a relatively larger number of CSI-RS samples than the other subbands of the group. In this example, the function (cost or reward) of the CSI-RS to subband assignment is based on the delay spread or coherence bandwidth.

Figure 8:
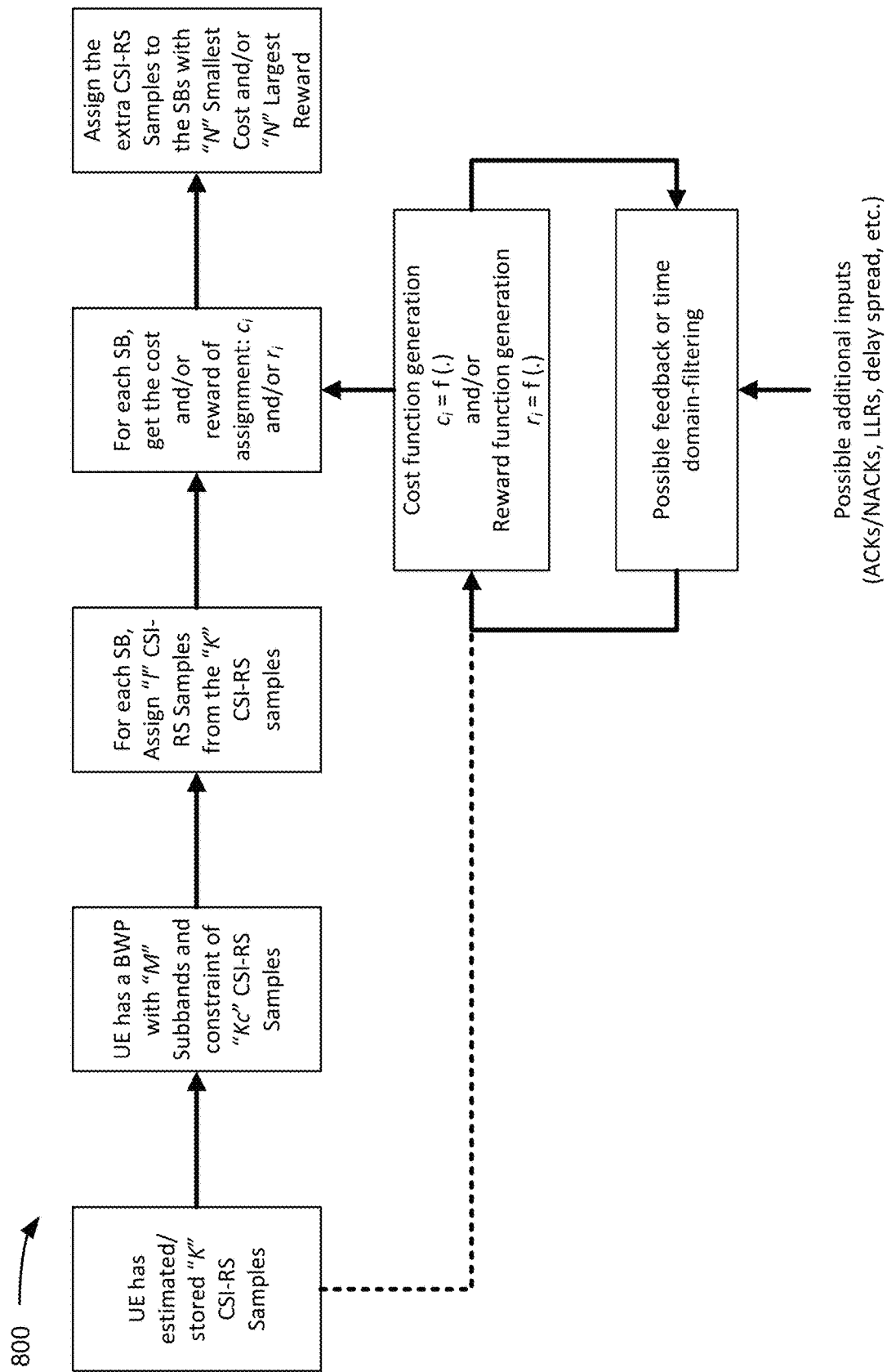
FIG. 8 illustrates an example of a sequence diagram for CSI-RS samples selection in subbands based on channel information of a BWP that includes the subbands, in accordance with some embodiments.

FIG. 8 illustrates an example of a sequence diagram 800 for CSI-RS samples selection in subbands based on channel information of a BWP that includes the subbands, in accordance with some embodiments. The sequence diagram 800 can begin with a UE having estimated and stored (e.g., in a memory buffer of the UE) "K" CSI-RS samples from "K" PRBs of a BWP carrying CSI-RSs. Next, the UE determines that the BWP has "M" subbands (e.g., based on an RRC configuration) and a constraint that limits its CSI reporting capability to use "Kc" CSI-RS samples of the "K" CSI-RS samples. For example, "Kc" can be pre-configured by design of the UE's CSI reporting capability. Based on the expression "Kc=l.M+N" (or, a generalization of this expression is possible as explained above), the UE assigns, for each subband, "l" CSI-RS samples from the "K" CSI-RS samples (or, equivalently, the "Kc" CSI-RS samples). In other words, for each subband, the CSI report is generated by using at least "l" samples of CSI-RS resources received in the subband. "N" remaining samples are to be assigned across the "M" subbands. To do so, for each subband "i," the UE gets the cost $c_i$ of assignment and/or the reward $r_i$ of assignment and uses a mapping function $f(\ )$ to compute the cost $c_i$ and/or the reward $r_i$ as a function of channel information of the BWP. In certain situations, possible feedback and/or time domain filtering are used based on additional inputs (e.g., number of ACKs/NACKs, LLRs, delay spread), whereby the cost $c_i$ and/or the reward $r_i$ are updated accordingly. The assignment of the "N" remaining samples to a subset of the "M" subbands is performed by determining the assignment that minimizes the cost and/or maximized the reward. Here, the UE can assign the "N" remaining samples to the subbands with the "N" smallest cost and/or "N" largest reward.

FIG. 9 illustrates an example of an operational flow/algorithmic structure 900 for selecting CSI-RS sample in subbands based on channel information of a BWP that includes the subbands, in accordance with some embodiments. The operation flow/algorithmic structure 900 may be performed or implemented by a UE such as, for example, the UE 104, UE 1100 or components thereof, for example, processors 1104. The UE can communicate with a network that includes a base station, such as the gNB 108 or the gNB 1200.

The operation flow/algorithmic structure 900 may include, at 902, determining that "Kc" CSI-RS samples are to be used in CSI reporting for "M" subbands, wherein "Kc" and "M" are positive integers, "M<Kc," and the "M" subbands belong to a BWP. For example, the network configures the BWP for the UE and sends "$K_{tot}$" CSI-RS signals in PRBs of the "M" configured PRBs. The UE receives the "$K_{tot}$" CSI-RS resources and based on a downsampling factor, measure "K" CSI-RS resources to generate and store in a memory buffer "K" CSI-RS samples, usable for different purposes. For the purpose of subband CSI reporting, the UE can be preconfigured to use "Kc" CSI-RS samples of the "K" CSI-RS samples, where "$Kc < K < K_{tot}$."

The operation flow/algorithmic structure 900 may include, at 904, determining that a first number of CSI-RS samples of the "Kc" CSI-RS samples is to be used for a first subband of the "M" subbands, wherein the first number of CSI-RS samples is different from a second number of CSI-RS samples determined for a second subband of the "M" subbands, wherein the first number of CSI-RS samples is determined based on channel information associated with the BWP. For example, the UE is pre-configured to perform a CSI-RS samples to subband assignment by resolving an optimization problem, where the optimization problem uses a cost function and/or a reward function, and where such function(s) include a transformation of the channel information and varies possible assignment to find the one that result in the minimum cost and/or the maximum reward. Example cost functions and/or reward functions are described herein above in connection with FIGS. 4-7.

The operation flow/algorithmic structure 900 may include, at 906, generating a CSI report for the first subband by at least using CSI-RS samples associated with the first subband, wherein a total number of the used CSI-RS samples for the CSI report is equal to the first number of CSI-RS samples. For example, the UE has already determined this first number and this first number is smaller than the number of sampled CSI-RS resources received in the subband. The UE can randomly, in an ascending PRB index order, in a descending PRB index order, or using any other pattern, select the first number of CSI-RS samples from the sampled CSI-RS resources and use the selected CSI-RS samples to measure different reporting quantities of the CSI report including, for instance, CQI and/or PMI.

The operation flow/algorithmic structure 900 may include, at 908, sending the CSI report to a network. For example, the CSI report can be sent periodically, semi-persistently, or aperiodically depending on the CSI report configuration (e.g., as set by the network using an RRC configuration).

Figure 10:
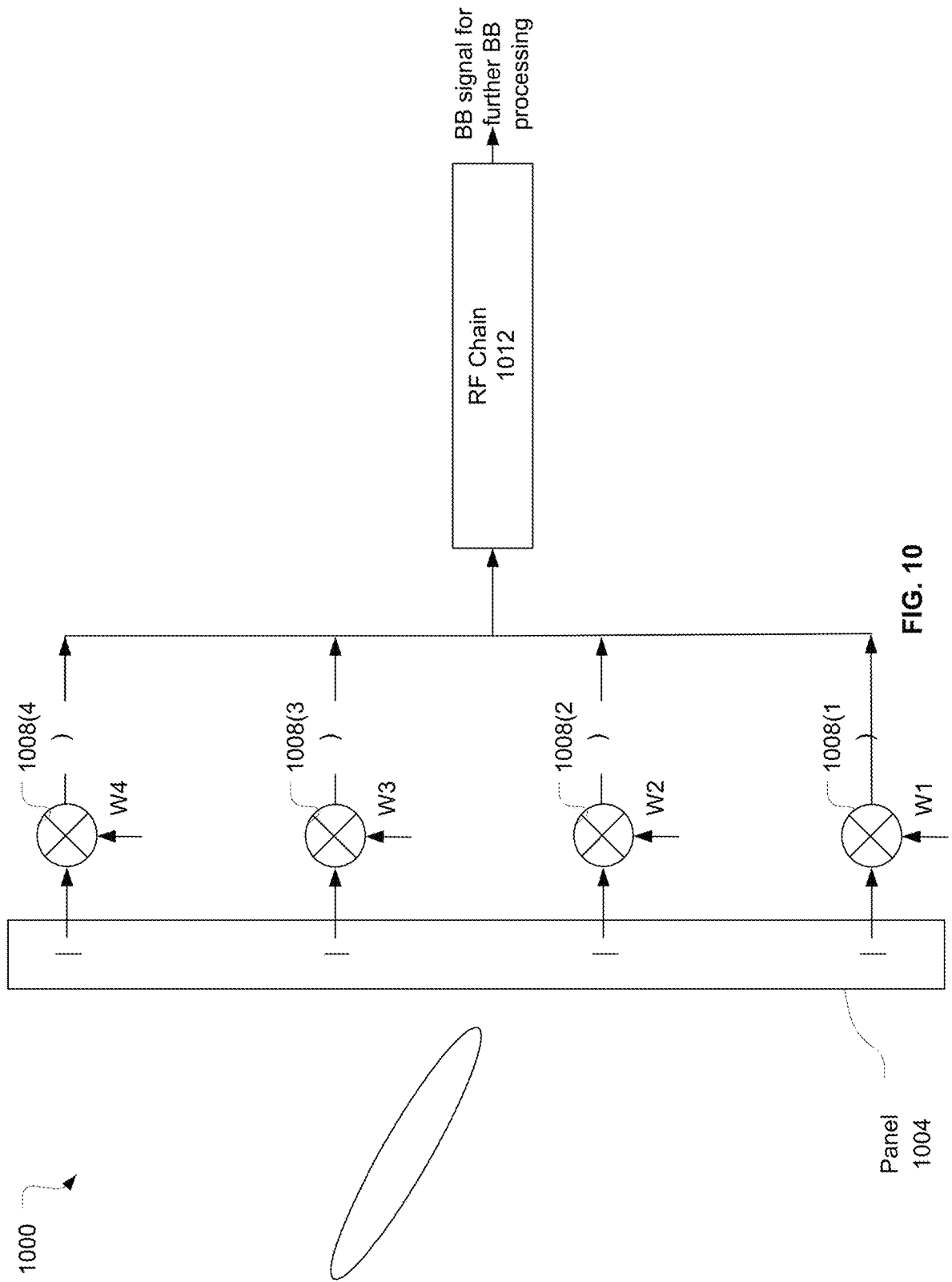
FIG. 10 illustrates an example of receive components, in accordance with some embodiments.

FIG. 10 illustrates receive components 1000 of the UE 104 in accordance with some embodiments. The receive components 1000 may include an antenna panel 1004 that includes a number of antenna elements. The panel 1004 is shown with four antenna elements, but other embodiments may include other numbers.

The antenna panel 1004 may be coupled to analog beamforming (BF) components that include a number of phase shifters 1008(1)-1008(4). The phase shifters 1008(1)-1008(4) may be coupled with a radio-frequency (RF) chain 1012. The RF chain 1012 may amplify a receive analog RF signal, downconvert the RF signal to baseband, and convert the analog baseband signal to a digital baseband signal that may be provided to a baseband processor for further processing.

In various embodiments, control circuitry, which may reside in a baseband processor, may provide BF weights (for example, W1-W4), which may represent phase shift values, to the phase shifters 1008(1)-1008(4) to provide a receive beam at the antenna panel 1004. These BF weights may be determined based on the channel-based beamforming.

Figure 11:
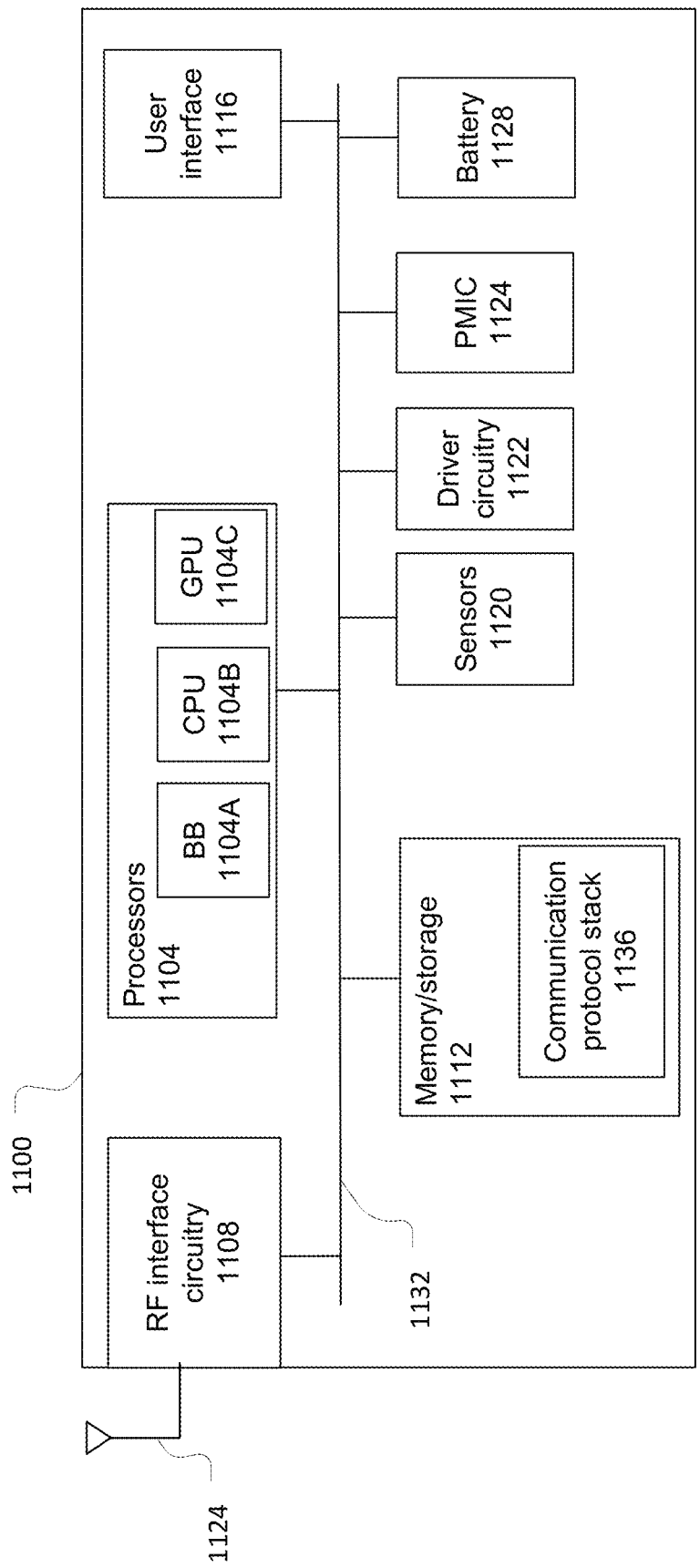
FIG. 11 illustrates an example of a UE, in accordance with some embodiments.

FIG. 11 illustrates a UE 1100 in accordance with some embodiments. The UE 1100 may be similar to and substantially interchangeable with UE 104 of FIG. 1.

Similar to that described above with respect to UE 124, the UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, or relaxed-IoT devices. In some embodiments, the UE may be a reduced capacity UE or NR-Light UE.

The UE 1100 may include processors 1104, RF interface circuitry 1108, memory/storage 1112, user interface 1116, sensors 1120, driver circuitry 1122, power management integrated circuit (PMIC) 1124, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangements of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based on cyclic prefix OFDM (CP-OFDM) in the uplink or downlink, and discrete Fourier transform spread OFDM (DFT-S-OFDM) in the uplink.

The baseband processor circuitry 1104A may also access group information 1124 from memory/storage 1112 to determine search space groups in which a number of repetitions of a PDCCH may be transmitted.

The memory/storage 1112 may include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1108 may include transceiver circuitry and a radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1124 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1124.

In various embodiments, the RF interface circuitry 1108 may be configured to transmit/receive signals in a manner compatible with NR access technologies.

The antenna 1124 may include a number of antenna elements that each convert electrical signals into radio waves to travel through the air and to convert received radio waves into electrical signals. The antenna elements may be arranged into one or more antenna panels. The antenna 1124 may have antenna panels that are omnidirectional, directional, or a combination thereof to enable beamforming and multiple-input, multiple-output communications. The antenna 1124 may include microstrip antennas, printed antennas fabricated on the surface of one or more printed circuit boards, patch antennas, phased array antennas, etc. The antenna 1124 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 as well as control and allow access to sensor circuitry 1120, drivers to obtain actuator positions of electro-mechanic components or control and allow access to the electro-mechanic components, a camera driver to control and allow access to an embedded image capture device, and/or audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1100 may power down for brief intervals of time and thus save power. If there is no data traffic activity for an extended period of time, then the UE 1100 may transition off to an RRC_Idle state, where it disconnects from the network and does not perform operations such as channel quality feedback, handover, etc. The UE 1100 goes into a very low power state and it performs paging where, again, it periodically wakes up to listen to the network and then powers down again. The UE 1100 may not receive data in this state; in order to receive data, it must transition back to an RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed that the delay is acceptable.

A battery 1128 may power the UE 1100, although in some examples the UE 1100 may be mounted and/or deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
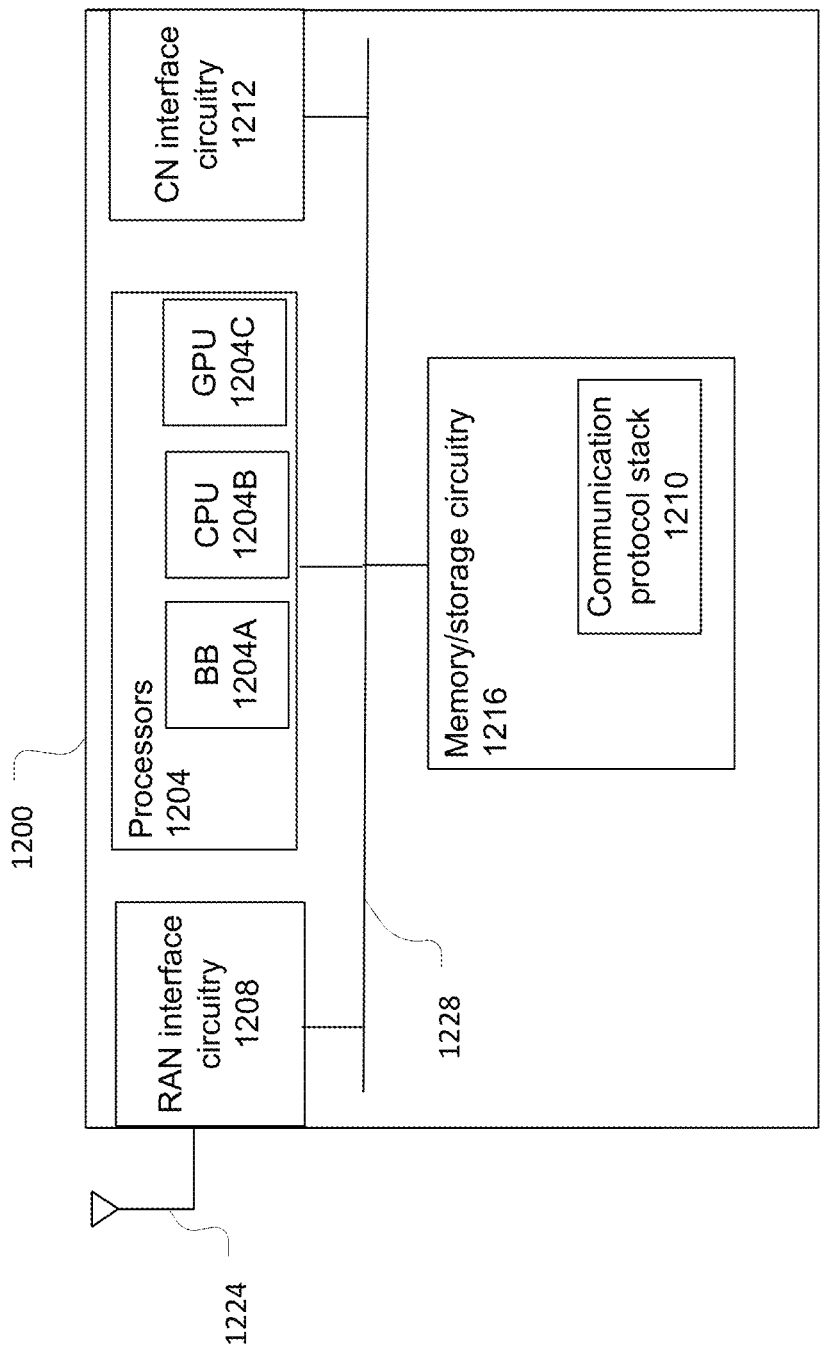
FIG. 12 illustrates an example of a base station, in accordance with some embodiments.

FIG. 12 illustrates a gNB 1200 in accordance with some embodiments. The gNB node 1200 may be similar to and substantially interchangeable with gNB 108.

The gNB 1200 may include processors 1204, RF interface circuitry 1208, core network (CN) interface circuitry 1212, and memory/storage circuitry 1216.

The components of the gNB 1200 may be coupled with various other components over one or more interconnects 1228.

The processors 1204, RF interface circuitry 1208, memory/storage circuitry 1216 (including communication protocol stack 1210), antenna 1224, and interconnects 1228 may be similar to like-named elements shown and described with respect to FIG. 10.

The CN interface circuitry 1212 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the gNB 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well-understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method implemented by a user equipment (UE), the method comprising: determining that Kc channel state information reference signal (CSI-RS) samples are to be used in channel state information (CSI) reporting for M subbands, wherein Kc and M are positive integers, M<Kc, and the M subbands belong to a bandwidth part (BWP); determining that a first number of CSI-RS samples of the Kc CSI-RS samples is to be used for a first subband of the M subbands, wherein the first number of CSI-RS samples is different from a second number of CSI-RS samples determined for a second subband of the M subbands, wherein the first number of CSI-RS samples is determined based on channel information associated with the BWP; generating a CSI report for the first subband by at least using CSI-RS samples associated with the first subband, wherein a total number of the used CSI-RS samples for the CSI report is equal to the first number of CSI-RS samples; and sending the CSI report to a network.

Example 2 includes a method of example 1, wherein the channel information is frequency-based and includes at least one of: a noise power per subband, a signal power per subband, or a coherence bandwidth of a subband group.

Example 3 includes a method of any preceding example, wherein the channel information is time-based and includes at least one of: a throughout per subband, block error rate (BLER) per subband, a number of acknowledgments (ACKs) or negative-acknowledgments (NACKs) per subband, a magnitude of a log-likelihood ratio per subband, or a rate per subband of subband allocation to the UE by the network.

Example 4 includes a method of any preceding example, wherein the method further comprises: determining that l CSI-RS samples of the Kc CSI-RS samples are to be used for each one of the M subbands and that N CSI-RS samples of the Kc CSI-RS samples are to be used across the M subbands, wherein l is an integer quotient of a division of Kc by M, and N is an integer remainder of the division; and using a function to determine S CSI-RS samples for the first subband from the N CSI-RS samples based on the channel information, wherein S is a positive integer smaller than N, wherein the function includes at least one of: a cost function or a reward function, and wherein the first number of CSI-RS samples is equal to the sum of l and S.

Example 5 includes a method of example 4, wherein the method further comprises: determining a noise and interference covariance matrix of the first subband, wherein the function is based on the noise and interference covariance matrix.

Example 6 includes a method of example 5, wherein the method further comprises: determining at least one of a spectral norm or a total power based on the noise and interference covariance matrix, wherein the function includes the at least of the spectral norm or the total power as a variable.

Example 7 includes a method of any preceding example 4 through 6, wherein the method further comprises: determining a signal-to-interference-plus-noise (SINR) estimate of the first subband, wherein the function is based on the SINR estimate.

Example 8 includes a method of example 7, wherein the function includes at least one of a negative of the SINR estimate or an inverse of the SINR estimate as a variable.

Example 9 includes a method of example 7, wherein the method further comprises: determining at least one of a mean of the SINR estimate or a variance of the SINR estimate, wherein the function includes the at least of the mean or the variance.

Example 10 includes a method of any preceding example 4 through 9, wherein the function includes a time-domain element of the first subband as a variable.

Example 11 includes a method of example 10, wherein the time-domain element includes a throughput of the first subband in previous slots.

Example 12 includes a method of any preceding example 10 through 11, wherein the time-domain element includes a block error rate (BLER) of the first subband in previous slots.

Example 13 includes a method of any preceding example 10 through 12, wherein the time-domain element includes a number of acknowledgments (ACKs) or negative-acknowledgments (NACKs) of the first subband in previous slots.

Example 14 includes a method of any preceding example 10 through 13, wherein the time-domain element includes a magnitude of a log-likelihood ratio of the first subband in previous slots.

Example 15 includes a method of any preceding example 10 through 14, wherein the time-domain element includes a rate of the network allocating the first subband to the UE in previous slots.

Example 16 includes a method of any preceding example 4 through 15, wherein the function is based on a coherence bandwidth of a subband group that includes the first subband.

Example 17 includes a UE comprising means to perform one or more elements of a method described in or related to any of the examples 1-16.

Example 18 includes one or more non-transitory computer-readable media comprising instructions to cause a UE, upon execution of the instructions by one or more processors of the UE, to perform one or more elements of a method described in or related to any of the examples 1-16.

Example 19 includes a UE comprising logic, modules, or circuitry to perform one or more elements of a method described in or related to any of the examples 1-16.

Example 20 includes a UE comprising: one or more processors and one or more computer-readable media comprising instructions that, when executed by the one or more processors, cause the one or more processors to perform one or more elements of a method described in or related to any of the examples 1-16.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

Applicant hereby claims:

1. A user equipment (UE) comprising:
one or more processors; and
one or more memories storing instructions that, upon execution by the one or more processors, configure the UE to:
determine that Kc channel state information reference signal (CSI-RS) samples are to be used in channel state information (CSI) reporting for M subbands, wherein Kc and M are positive integers, M<Kc, and the M subbands belong to a bandwidth part (BWP);
determine that a first number of CSI-RS samples of the Kc CSI-RS samples is to be used for a first subband of the M subbands, wherein the first number of CSI-RS samples is different from a second number of CSI-RS samples determined for a second subband of the M subbands, wherein the first number of CSI-RS samples is determined based on channel information associated with the BWP;
generate a CSI report for the first subband by at least using CSI-RS samples associated with the first subband, wherein a total number of the used CSI-RS samples for the CSI report is equal to the first number of CSI-RS samples; and
send the CSI report to a network.

2. The UE of claim 1, wherein the channel information is frequency-based and includes at least one of: a noise power per subband, a signal power per subband, or a coherence bandwidth of a subband group.

3. The UE of claim 1, wherein the channel information is time-based and includes at least one of: a throughout per subband, block error rate (BLER) per subband, a number of acknowledgments (ACKs) or negative-acknowledgments (NACKs) per subband, a magnitude of a log-likelihood ratio per subband, or a rate per subband of subband allocation to the UE by the network.

4. The UE of claim 1, wherein the execution of the instructions further configures the UE to:
determine that/CSI-RS samples of the Kc CSI-RS samples are to be used for each one of the M subbands and that N CSI-RS samples of the Kc CSI-RS samples are to be used across the M subbands, wherein l is an integer quotient of a division of Kc by M, and N is an integer remainder of the division; and
use a function to determine S CSI-RS samples for the first subband from the N CSI-RS samples based on the channel information, wherein S is a positive integer smaller than N, wherein the function includes at least one of: a cost function or a reward function, and wherein the first number of CSI-RS samples is equal to the sum of l and S.

5. The UE of claim 4, wherein the execution of the instructions further configures the UE to:
determine a noise and interference covariance matrix of the first subband, wherein the function is based on the noise and interference covariance matrix.

6. The UE of claim 5, wherein the execution of the instructions further configures the UE to:
determine at least one of a spectral norm or a total power based on the noise and interference covariance matrix, wherein the function includes the at least of the spectral norm or the total power as a variable.

7. The UE of claim 4, wherein the execution of the instructions further configures the UE to:
determine a signal-to-interference-plus-noise (SINR) estimate of the first subband, wherein the function is based on the SINR estimate.

8. The UE of claim 7, wherein the function includes at least one of a negative of the SINR estimate or an inverse of the SINR estimate as a variable.

9. The UE of claim 7, wherein the execution of the instructions further configures the UE to:
determine at least one of a mean of the SINR estimate or a variance of the SINR estimate, wherein the function includes the at least of the mean or the variance.

10. The UE of claim 4, wherein the function includes a time-domain element of the first subband as a variable.

11. The UE of claim 10, wherein the time-domain element includes a throughput of the first subband in previous slots.

12. The UE of claim 10, wherein the time-domain element includes a block error rate (BLER) of the first subband in previous slots.

13. The UE of claim 10, wherein the time-domain element includes a number of acknowledgments (ACKs) or negative-acknowledgments (NACKs) of the first subband in previous slots.

14. The UE of claim 10, wherein the time-domain element includes a magnitude of a log-likelihood ratio of the first subband in previous slots.

15. The UE of claim 10, wherein the time-domain element includes a rate of the network allocating the first subband to the UE in previous slots.

16. The UE of claim 4, wherein the function is based on a coherence bandwidth of a subband group that includes the first subband.

17. One or more non-transitory computer-readable media storing instructions that, upon execution by a user equipment (UE), cause the UE to perform operations comprising:
    determining that Kc channel state information reference signal (CSI-RS) samples are to be used in channel state information (CSI) reporting for M subbands, wherein Kc and M are positive integers, M<Kc, and the M subbands belong to a bandwidth part (BWP);
    determining that a first number of CSI-RS samples of the Kc CSI-RS samples is to be used for a first subband of the M subbands, wherein the first number of CSI-RS samples is different from a second number of CSI-RS samples determined for a second subband of the M subbands, wherein the first number of CSI-RS samples is determined based on channel information associated with the BWP;
    generating a CSI report for the first subband by at least using CSI-RS samples associated with the first subband, wherein a total number of the used CSI-RS samples for the CSI report is equal to the first number of CSI-RS samples; and
    sending the CSI report to a network.

18. The one or more non-transitory computer-readable media of claim 17, wherein the operations further comprise:
    determining that/CSI-RS samples of the Kc CSI-RS samples are to be used for each one of the M subbands and that N CSI-RS samples of the Kc CSI-RS samples are to be used across the M subbands, wherein/is an integer quotient of a division of Kc by M, and N is an integer remainder of the division; and
    using a function to determine S CSI-RS samples for the first subband from the N CSI-RS samples based on the channel information, wherein S is a positive integer smaller than N, wherein the function includes at least one of: a cost function or a reward function, and wherein the first number of CSI-RS samples is equal to the sum of l and S.

19. A method implemented by a user equipment (UE), the method comprising:
    determining that Kc channel state information reference signal (CSI-RS) samples are to be used in channel state information (CSI) reporting for M subbands, wherein Kc and M are positive integers, M<Kc, and the M subbands belong to a bandwidth part (BWP);
    determining that a first number of CSI-RS samples of the Kc CSI-RS samples is to be used for a first subband of the M subbands, wherein the first number of CSI-RS samples is different from a second number of CSI-RS samples determined for a second subband of the M subbands, wherein the first number of CSI-RS samples is determined based on channel information associated with the BWP;
    generating a CSI report for the first subband by at least using CSI-RS samples associated with the first subband, wherein a total number of the used CSI-RS samples for the CSI report is equal to the first number of CSI-RS samples; and
    sending the CSI report to a network.

20. The method of claim 19, wherein the channel information includes at least one of: a noise power per subband, a signal power per subband, a coherence bandwidth of a subband group, a throughout per subband, block error rate (BLER) per subband, a number of acknowledgments (ACKs) or negative-acknowledgments (NACKs) per subband, a magnitude of a log-likelihood ratio per subband, or a rate per subband of subband allocation to the UE by the network.

* * * * *

UNITED STATES PATENT AND TRADEMARK OFFICE
CERTIFICATE OF CORRECTION

PATENT NO. : 12,207,123 B2
APPLICATION NO. : 17/868611
DATED : January 21, 2025
INVENTOR(S) : Ghaith N. Hattab, Louay Jalloul and Ismael Gutierrez Gonzalez It is certified that error appears in the above-identified patent and that said Letters Patent is hereby corrected as shown below:

In the Claims

In Column 22, Line 29: In Claim 4 please delete "that/CSI-RS" and insert --that 1 CSI-RS--.

In Column 23, Line 43: In Claim 18 please delete "that/CSI-RS" and insert --that 1 CSI-RS--.

In Column 24, Line 2: In Claim 18 please delete "wherein/is" and insert --wherein 1 is--.

Signed and Sealed this
Fourth Day of March, 2025

Coke Morgan Stewart
*Acting Director of the United States Patent and Trademark Office*